United States Patent
Koishi (10) Patent No.: US 8,326,027 B2
(45) Date of Patent: Dec. 4, 2012

(54) CONVERSION MATRIX DETERMINING METHOD, IMAGE PROCESSING DEVICE, IMAGE PROCESSING PROGRAM AND IMAGING APPARATUS

(75) Inventor: Erika Koishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 988 days.

(21) Appl. No.: 12/309,521

(22) PCT Filed: Jul. 25, 2007

(86) PCT No.: PCT/JP2007/064558
§ 371 (c)(1),
(2), (4) Date: Jan. 22, 2009

(87) PCT Pub. No.: WO2008/013192
PCT Pub. Date: Jan. 31, 2008

(65) Prior Publication Data
US 2010/0054582 A1 Mar. 4, 2010

(30) Foreign Application Priority Data
Jul. 25, 2006 (JP) .................................. 2006-202312

(51) Int. Cl.
*G06K 9/00* (2006.01)
*G06K 9/34* (2006.01)
(52) U.S. Cl. ........................................ 382/162; 382/166
(58) Field of Classification Search .................. 382/162, 382/164, 165–167; 345/589, 590, 600–604, 345/690; 358/1.9, 2.1, 515, 518, 520–521, 358/523, 525, 530; 348/659, 661, E5.094; 356/405
See application file for complete search history.

(56) References Cited

U.S. PATENT DOCUMENTS

| | | | | |
|---|---|---|---|---|
| 5,150,206 | A | * | 9/1992 | Roberts ......................... 348/661 |
| 5,258,829 | A | | 11/1993 | Matsunaga et al. |
| 5,272,518 | A | * | 12/1993 | Vincent ......................... 356/405 |
| 5,565,931 | A | * | 10/1996 | Girod ............................ 348/675 |
| 5,987,167 | A | | 11/1999 | Inoue |
| 6,320,668 | B1 | | 11/2001 | Kim |
| 6,657,746 | B1 | * | 12/2003 | Fuchigami et al. ............ 358/1.9 |
| 7,289,663 | B2 | * | 10/2007 | Spaulding et al. ............ 382/167 |
| 7,561,167 | B2 | * | 7/2009 | Nitta et al. .................... 345/603 |

(Continued)

FOREIGN PATENT DOCUMENTS

JP A-02-219371 8/1990

(Continued)

OTHER PUBLICATIONS

Apr. 26, 2011 Office Action in Japanese Application No. 2008-526789 (with translation).

(Continued)

*Primary Examiner* — Amir Alavi
(74) *Attorney, Agent, or Firm* — Oliff & Berridge, PLC (57) ABSTRACT

A conversion matrix determining method for determining a conversion matrix to be used in color conversion processing executed on a photographic image, includes: obtaining image data of an image captured under a given condition and a colorimetric value measured under a condition identical to the given condition from a subject of the image data; and determining a conversion matrix to be used to execute color conversion on an image signal in a nonlinear color space where a luminance value changes nonlinearly, based upon the image data and the colorimetric value having been obtained.

12 Claims, 8 Drawing Sheets

U.S. PATENT DOCUMENTS

| | | | |
|---|---|---|---|
| 7,933,445 B2* | 4/2011 | Pan et al. | 382/167 |
| 2001/0010762 A1* | 8/2001 | Hirai et al. | 396/225 |
| 2002/0135828 A1* | 9/2002 | Shirochi et al. | 358/521 |
| 2005/0018226 A1 | 1/2005 | Chiba | |
| 2010/0054582 A1* | 3/2010 | Koishi | 382/162 |

FOREIGN PATENT DOCUMENTS

| | | |
|---|---|---|
| JP | A-02-234592 | 9/1990 |
| JP | A-2002-116750 | 4/2002 |
| JP | A-2003-230154 | 8/2003 |
| JP | A-2005-045446 | 2/2005 |
| JP | A-2005-303704 | 10/2005 |

OTHER PUBLICATIONS

Mar. 22, 2010 Extended Search Report issued in European Patent Application No. 07791274.9.

Unknown, "Fine Imaging and Digital Photography," *Society of Photographic Science and Technology of Japan*, Jun. 15, 2001, pp. 425-426 (with partial translation).

* cited by examiner

CONVERSION MATRIX DETERMINING METHOD, IMAGE PROCESSING DEVICE, IMAGE PROCESSING PROGRAM AND IMAGING APPARATUS

This Application is a 371 of PCT/JP2007/064558 filed on Jul. 25, 2007

TECHNICAL FIELD

The present invention relates to a conversion matrix determining method that may be adopted when determining a conversion matrix to be used for color conversion of a photographic image, an image processing device, an image processing program and an imaging apparatus equipped with the conversion matrix having been determined.

BACKGROUND ART

There is a technology known in the related art, whereby image data expressed in a color space assuming nonlinearity to intensity signals corresponding to the three primary colors of light are first converted to image data expressed in a color space achieving linearity to the individual intensity signals corresponding to the three primary colors of light, the image data expressed in the linear color space undergo color conversion processing through matrix conversion and the image data having undergone the color conversion processing are converted back into image data expressed in the non-linear color space (see, for instance, patent reference 1).
Patent reference 1: Japanese Laid Open Patent Publication No. 2002-116750

DISCLOSURE OF THE INVENTION

Problems to be Solved by the Invention

While the color reproducibility improves through the color conversion executed in the linear color space, there is an issue yet to be addressed with regard to image input/output executed in an sRGB color space, which is routinely used as an image input/output space, in that since it is defined as a nonlinear color space expressed as $\gamma=2.2$ in conformance to the $\gamma$ characteristics (input-light emission characteristics) of the monitor, nonlinear conversion processing must be executed during image input/output resulting in a heavy processing load.

Means for Solving the Problems

According to the 1st aspect of the present invention, a conversion matrix determining method for determining a conversion matrix to be used in color conversion processing executed on a photographic image, comprises: obtaining image data of an image captured under a given condition and a colorimetric value measured under a condition identical to the given condition from a subject of the image data; and determining a conversion matrix to be used to execute color conversion on an image signal in a nonlinear color space where a luminance value changes nonlinearly, based upon the image data and the colorimetric value having been obtained.

According to the 2nd aspect of the present invention, in the conversion matrix determining method according to the 1st aspect, it is preferred that the given condition is a condition related to an optical system present between the subject and an imaging apparatus used to photograph the image consti-tuted with the image data or between the subject and a measuring device used to obtain the colorimetric value.

According to the 3rd aspect of the present invention, in the conversion matrix determining method according to the 1st or the 2nd aspect, it is preferred that: an image signal in a first color space, which is a nonlinear color space where the image data are expressed, is obtained; the image signal in the first color space is converted through nonlinear conversion to an image signal in a second color space, which is a linear color space that changes linearly relative to the luminance value; a temporary conversion matrix to be used in color conversion, through which the image signal in the second color space is converted to an image signal in a third color space, which is a linear color space, is determined; color conversion is executed by using the temporary conversion matrix having been determined to convert the image signal in the second color space to the image signal in the third color space; the image signal in the third color space is converted through nonlinear conversion to an image signal in a fourth color space, which is a nonlinear color space; and the conversion matrix is determined so as to minimize a color difference between an image signal obtained by executing color conversion on the image signal in the first color space based upon the conversion matrix and the image signal in the fourth color space.

According to the 4th aspect of the present invention, in the conversion matrix determining method according to the 3rd aspect, it is preferred that the temporary conversion matrix is determined by taking into consideration a difference between a viewing condition in which the image data are obtained through a photographing operation and a viewing condition in which the image data are reproduced.

According to the 5th aspect of the present invention, in the conversion matrix determining method according to the 4th aspect, it is preferred that: color of the subject is measured in the viewing condition in which the image data are obtained through a photographing operation; a color to be taken on in the third color space is estimated based upon the colorimetric value obtained through color-measurement by taking into consideration chromatic adaptation attributable to the difference between the viewing conditions; and the temporary conversion matrix is determined based upon image data in the second color space and the estimated color in the third color space.

According to the 6th aspect of the present invention, in the conversion matrix determining method according to any one of the 3rd through 5th aspects, it is preferred that the nonlinear conversion from the first color space to the second color space is equivalent to nonlinear conversion from the fourth color space to the third color space.

According to the 7th aspect of the present invention, in the conversion matrix determining method according to any one of the 1st through 6th aspects, it is preferred that the specific color is a color appearing frequently in the photographic image.

According to the 8th aspect of the present invention, in the conversion matrix determining method according to the 7th aspect, it is preferred that: the conversion matrix that has been determined is used in an image processing program installed in a microscope digital camera; and the subject of the image data assumes a color appearing frequently in an image observed through a microscope.

According to the 9th aspect of the present invention, a conversion matrix determining method for determining a conversion matrix to be used in color conversion processing executed on a photographic image, comprises: obtaining an image signal in a first color space that is a nonlinear color space; converting through nonlinear conversion the image signal in the first color space to an image signal in a second color space, which is a linear color space that changes linearly relative to a luminance value; determining a first conversion matrix to be used in color conversion executed to convert the image signal in the second color space to an image signal in a third color space, which is a linear color space; executing color conversion by using the first conversion matrix having been determined to convert the image signal in the second color space to the image signal in the third color space; converting through nonlinear conversion the image signal in the third color space to an image signal in a fourth color space, which is a nonlinear color space; and determining a conversion matrix so as to minimize a color difference between an image signal obtained by executing color conversion on the image signal in the first color space based upon the conversion matrix and the image signal in the fourth color space.

According to the 10th aspect of the present invention, an image processing program enables a computer to execute a conversion matrix determining method according to any one of the 1st through 9th aspects.

According to the 11th aspect of the present invention, an image processing device comprises: an image processing program according to the 10th aspect having installed.

According to the 12th aspect of the present invention, an imaging apparatus comprises: an image processing program that uses a conversion matrix determined through a conversion matrix determining method according to any one of the 1st through 9th aspects.

Advantageous Effect of the Invention

According to the present invention adopting the structure described above, high-speed processing is enabled while assuring a high level of accuracy in color reproduction.

BEST MODE FOR CARRYING OUT THE INVENTION

In reference to an embodiment, a method that may be adopted to render a photographic image obtained by capturing a microscope image (refers to an image enlarged via a microscope) with a camera having an appearance that is close to that of an image observed through a microscope with the naked eye, is described. More specifically, a method that may be adopted when determining the conversion matrix to be used in color conversion processing executed in a camera on an image having been photographed with the camera is described.

—Microscope Observation System—

Figure 1:
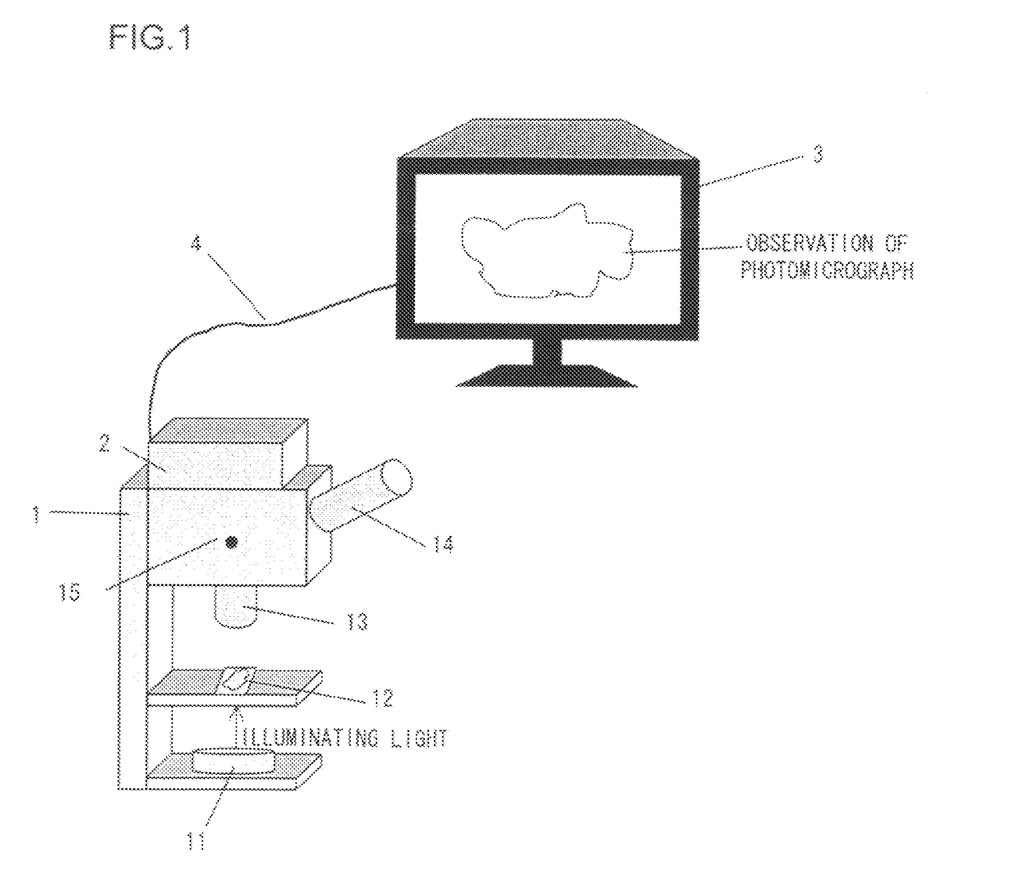
FIG. 1 A microscope observation system constituted with a microscope 1, a microscope digital camera 2 and a monitor 3

FIG. 1 shows a microscope observation system made up with a microscope 1, a microscope digital camera (hereafter may be simply referred to as a digital camera) 2 and a monitor 3. The digital camera 2 and the monitor 3 are connected via a cable 4. A specimen 12 is illuminated with an illuminating light source 11 and a specimen image magnified through an objective lens 13 and an eyepiece lens 14 can be observed through the microscope 1. As shown in FIG. 1, the digital camera 2 is mounted atop the microscope 1. Via the digital camera 2, the photographic image can be displayed in real-time at the monitor 3 connected to the digital camera 2.

The microscope 1 includes a visual field selector switch 15 via which the visual field can be switched to the eyepiece lens 14 or to the digital camera 2. Thus, the specimen 12 can be directly observed with the naked eye through the eyepiece lens 14 or the specimen 12 can be observed as a microscope image captured with a digital camera 2, which is brought up on display at the monitor 3. While the setting can be adjusted completely to the eyepiece lens side or the digital camera side via the visual field selector switch 15, the light can be split into halves via the visual field selector switch as well. Thus, the specimen can be observed simultaneously through the eyepiece lens 14 and on the monitor 3.

A specific type of color conversion processing is executed in the digital camera 2 in the embodiment, so as to ensure that the image observed directly through the eyepiece lens 14 at the microscope 1 and the microscope image captured with a digital camera 2 and displayed at the monitor 3 have similar appearances.

The image observed at the microscope 1 and the display image at the monitor 3 may appear different mainly due to the difference in the color temperature of the light source 11 and the color temperature of the monitor 3, the difference between the levels of the illumination brightness of the light source 11 and the monitor 3, the difference between the ambient illumination conditions under which the image is observed through the eyepiece lens 14 and the ambient illumination conditions under which the image on display at the monitor 3 is observed. While the color temperature of the monitor 3 in a standard viewing condition is fixed at D65, the color temperature of the microscope illumination is determined by the characteristics of the lamp constituting the light source 11 and is often lower than that of the monitor 3, at approximately 3000 K~5000 K. This means that the image displayed at the monitor 3 is bound to take on a hue different from that of the microscope observation image directly viewed with the naked eye through the eyepiece lens 14 unless the difference between the color temperature at the illuminating light source 11 and the color temperature at the monitor 3 is factored in.

In addition, the luminance of the monitor 3 in the standard viewing condition is fixed at 80 $Cd/m^2$ and the luminance at the LCD typically used in this type of application can only be set to approximately 200 $Cd/m^2$ at the most. In reality, the luminance of the monitor at its maximum brightness setting will decrease due to deterioration occurring over years and, for this reason, the monitor is more likely to be used with the luminance level at or below 200 $Cd/m^2$. When the specimen is observed through the eyepiece lens 14 at the microscope 1, the luminance is often equal to or higher than 300 $Cd/m^2$ and under certain circumstances, the specimen may be observed at a luminance level equal to or higher than 1000 $Cd/m^2$, almost 10 times the luminance level at which the image displayed on the monitor is observed.

The ambient illumination conditions are another factor that will affect the appearance of the specimen image. When the specimen is observed through the eyepiece lens 14 at the microscope, the user will have his eye placed near the eyepiece lens to look at the microscope observation image, and will be not much affected by the surrounding conditions (i.e., it will not matter whether the surrounding environment is light or dark). The image displayed on the monitor is normally observed in a brightly lit laboratory (room) and, for this reason, the monitor display image will appear to have less contrast compared to the specimen image directly observed through the eyepiece lens 14. Furthermore, if the color temperature of the monitor 3 and the color temperature of the ambient illumination are different, the ambient illumination color temperature also needs to be considered since the visual perception is also affected by the color temperature of the ambient illumination.

In the embodiment, the following image processing is executed within the digital camera so as to ensure that the microscope observation image of the specimen 12 directly observed through the eyepiece lens 14 and the microscope observation image of the specimen 12 indirectly observed via the monitor 3 have similar appearance by factoring in the varying viewing conditions discussed above. In addition, the processing must be executed at high speed in the digital camera 2 in order to provide a real-time microscope observation image of the specimen 12 at the monitor 3. Accordingly, high-speed image processing to be detailed below is executed within the digital camera 2.

—Standard Digital Camera—

Figure 2:
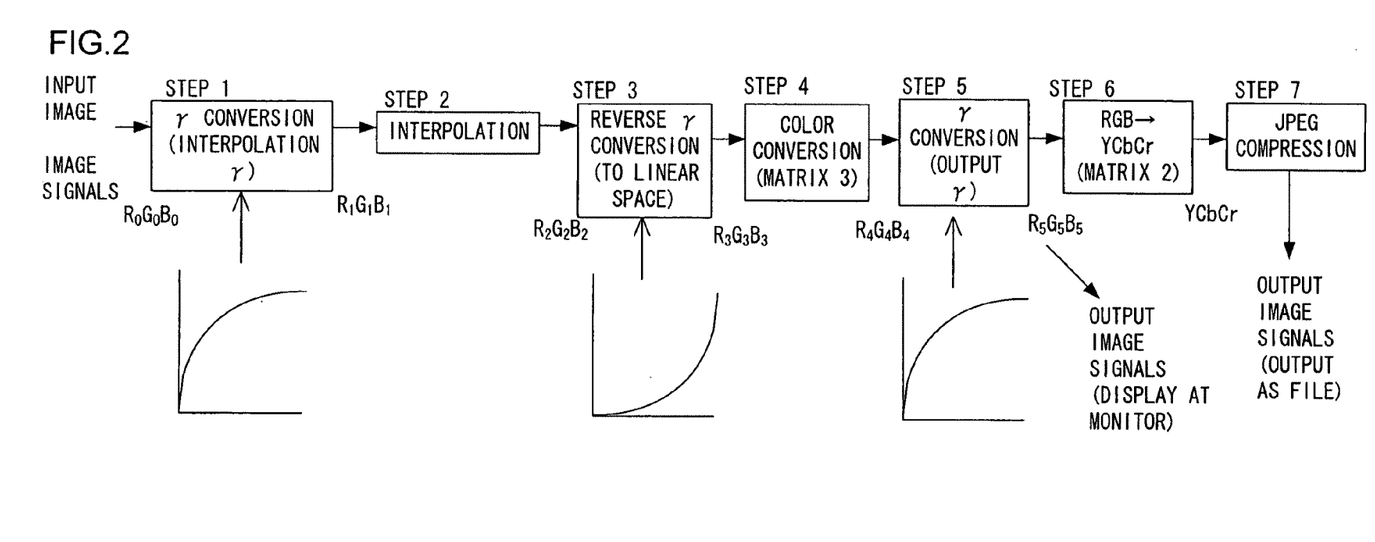
FIG. 2 A flowchart of the image processing executed in a standard digital camera FIG. 3 A flowchart of the image processing executed in the digital camera 2

Before describing the image processing executed in the microscope digital camera 2 in the embodiment, image processing executed in a standard digital camera used to photograph landscapes, people and the like, is explained. FIG. 2 shows the flow of the image processing executed in the standard digital camera. A photographic image undergoes several phases of image processing including interpolation processing and color conversion processing to create an output image.

First, in STEP 1, an input image $(R_0G_0B_0)$ (image signals) in the color space photographed with the digital camera undergoes nonlinear conversion executed by using interpolation γ so that RGB values corresponding the intensity levels of the three primary colors of light change nonlinearly, thereby enabling processing in a color space optimal for interpolation processing. In STEP 2, the image $(R_1G_1B_1)$ in the nonlinear color space undergoes the interpolation processing, thereby generating an interpolated image $(R_2G_2B_2)$. In STEP 3, the image having undergone the interpolation processing in STEP 2 undergoes nonlinear processing (reverse γ conversion) to convert it back to an image $(R_3G_3B_3)$ in a linear color space optimal for color conversion processing. In STEP 4, the image $(R_3G_3B_3)$ in the linear color space undergoes color conversion based upon a 3×3 Matrix 3 so as to convert the image to an image $(R_4G_4B_4)$ taking on a color appearance similar to that of the photographic image or taking on a color appearance achieved through desirable color reproduction by factoring in the difference between the viewing conditions under which the image was photographed and the viewing conditions under which the image is displayed at the monitor. The conversion executed based upon Matrix 3 is linear conversion. The color space selected as the output target color space is a standard color space such as sRGB.

In STEP 5, the image $(R_4G_4B_4)$ in the linear color space undergoes nonlinear conversion executed inline with the output gradation correction characteristics γ (e.g., γ=2.2, defined in the sRGB space or the γ characteristics corresponding to the image composition) determined based upon the monitor output characteristics relative to the input value, thereby creating an image $(R_5G_5B_5)$ in a nonlinear color space. This color space image $(R_5G_5B_5)$ is used for monitor display or the like.

The image signals each need to be separated into a brightness signal and color difference signals if they are to be output as a JPEG compressed file. In STEP 6, the RGB data resulting from the processing executed in STEP 5 are converted to YCbCr data based upon a 3×3 Matrix 2. Lastly, JPEG compression is executed in STEP 7 and the resulting image signals are output. Namely, an image data file resulting from the JPEG compression is output.

A standard digital camera, which is likely to be used to photograph subjects with various colors and brightness (luminance) levels in landscapes, portraits and the like, needs to assure accurate expression over the full color range and the full gradation range. For this reason, image data are first converted back to those in the linear color space, the image data in the linear color space then undergo color conversion executed based upon a conversion matrix to be converted to data in another linear color space and then nonlinear conversion is executed so as to achieve gradation optimal for output (to a monitor or the like). The image data must undergo this process since if matrix conversion is executed in a nonlinear color space and the conversion matrix is adjusted so that the appearances of the color at a predetermined brightness level approximate each other, the hue of a color with a brightness level or a hue greatly different from that of the color used in the adjustment may rotate as a result of the conversion or its gradation may not be expressed accurately in the converted data.

—Microscope Digital Camera—

Unlike a standard digital camera used to photograph landscapes and the like, a microscope digital camera such as the microscope digital camera 2 according to the present invention is used to photograph very specific types of subjects. For instance, the subject displayed at a biological microscope will mainly take on a specific color corresponding to the type of stain and unlike a landscape photograph, the full ranges of color and gradation do not need to be reproduced in a single image. In addition, it is often more important to be able to distinguish colors (different areas of the specimen), e.g., distinguish red from blue, or distinguish different levels of density in an image of a biological specimen.

While the hue of a color not factored in while creating the matrix used in matrix operation executed in a nonlinear color space may rotate slightly, the hue will not reverse (e.g., red turning into blue or vice versa) or the density levels do not reverse either as long as correct adjustment is implemented. Accordingly, by using a conversion matrix adjusted optimally in correspondence to the characteristics of the observation target specimen, an image photographed with the microscope digital camera 2 may undergo matrix operation in a nonlinear color space and still allow image reproduction with an appearance comparable to that in the related art. Since the number of nonlinear conversion sessions can be reduced by two over that required in the standard digital camera by executing the matrix operation in a nonlinear color space, the processing can be executed even faster in the camera.

Figure 3:
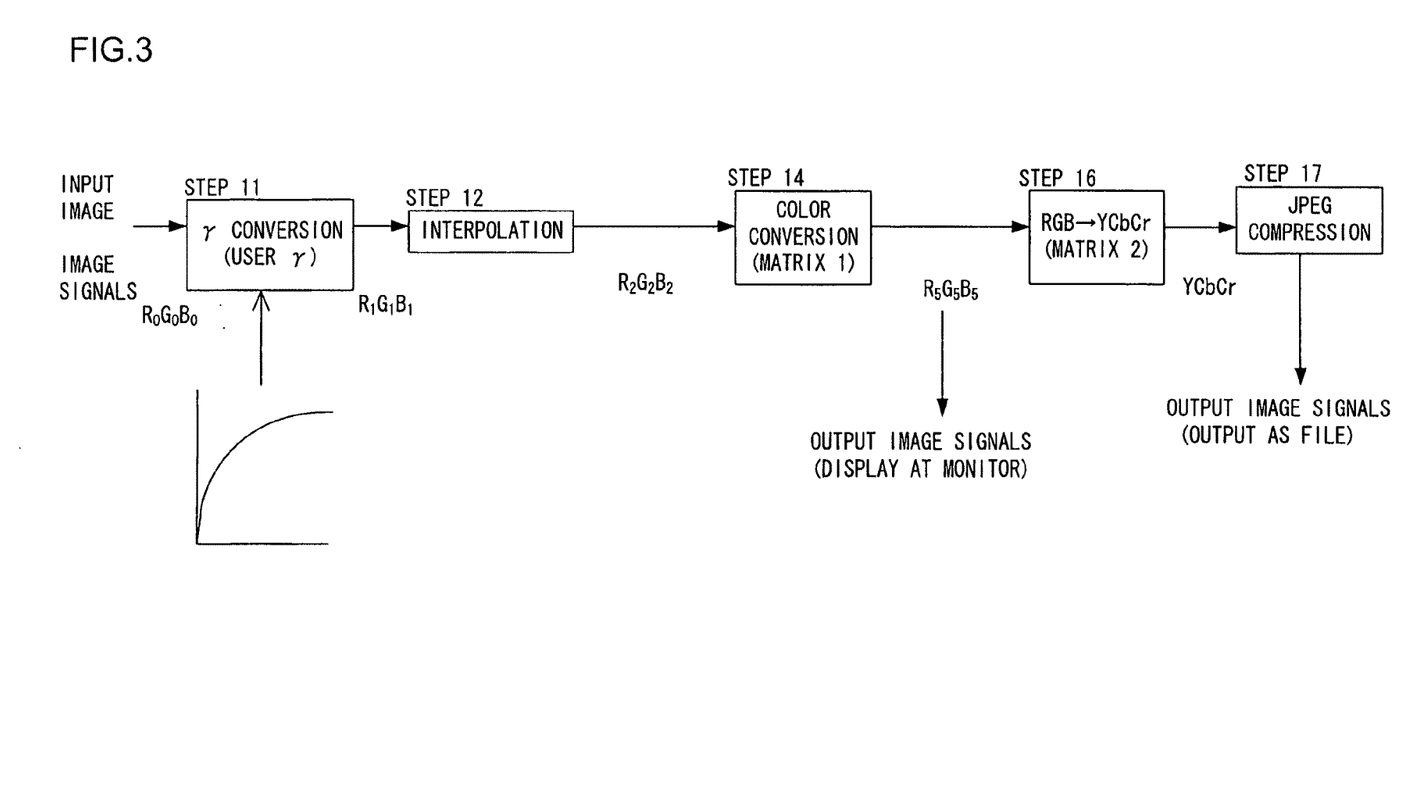

Accordingly, image processing such as that shown in FIG. 3 is executed in the digital camera 2 in the embodiment. FIG. 3 presents a flowchart of the image processing executed in the digital camera 2.

An input image (image signal) $(R_0G_0B_0)$ in the color space photographed with a digital camera is input as in STEP 1 in FIG. 2 and undergoes nonlinear conversion based upon user gradation correction characteristics γ in STEP 11. The user gradation correction characteristics γ are different from the interpolation gradation correction characteristics γ in FIG. 2, but instead are determined by taking into consideration requirements related to the interpolation processing and the image composition for the output. Such user gradation correction characteristics γ may be presented by an S-shaped curve. Thus, an image ($R_1G_1B_1$) in a nonlinear color space, optimal for the interpolation processing and the output, is generated in STEP 11.

In STEP 12, the interpolation processing is executed on the image ($R_1G_1B_1$) in the nonlinear color space, thereby generating an interpolated image ($R_2G_2B_2$). In STEP 14, the nonlinear color space image ($R_2G_2B_2$) resulting from the interpolation processing undergoes color conversion based upon a 3×3 Matrix 1, so as to convert it to an image ($R_5G_5B_5$) in a color space for image signal output. The image signal output color space ($R_5G_5B_5$) is an output target color space that may be equivalent to a standard color space such as sRGB. The conversion executed based upon Matrix 1 is linear conversion. The image ($R_5G_5B_5$) in the color space generated through STEP 14 is similar to the nonlinear color space image ($R_5G_5B_5$) generated through the nonlinear conversion in STEP 6 in FIG. 2.

The image signals each need to be separated into a brightness signal and color difference signals if they are to be output as a JPEG compressed file. Accordingly, the RGB data are converted to YCbCr data based upon a 3×3 Matrix 2 in STEP 16, as in STEP 6 in FIG. 2. JPEG compression is executed and the resulting image signals are output in STEP 17, as in STEP 7 in FIG. 2. Namely, an image data file resulting from the JPEG compression is output.

As described above, the image ($R_2G_2B_2$) in the nonlinear color space undergoes matrix conversion executed based upon the linear conversion Matrix 1 to generate an image ($R_5G_5B_5$) in a nonlinear color space in the microscope digital camera 2 in the embodiment. Since this reduces the number of nonlinear conversion sessions by two from that required in the image processing executed in the standard digital camera shown in FIG. 2, the processing executed in the digital camera 2 is expedited.

Matrix 1 used in STEP 14 when executing the color conversion in the nonlinear color space, as described above, must be optimized for the observation target specimen. The adjustment of Matrix 1, i.e., the method adopted when determining Matrix 1, is described below.

—Determining Matrix 1—

Figure 4:
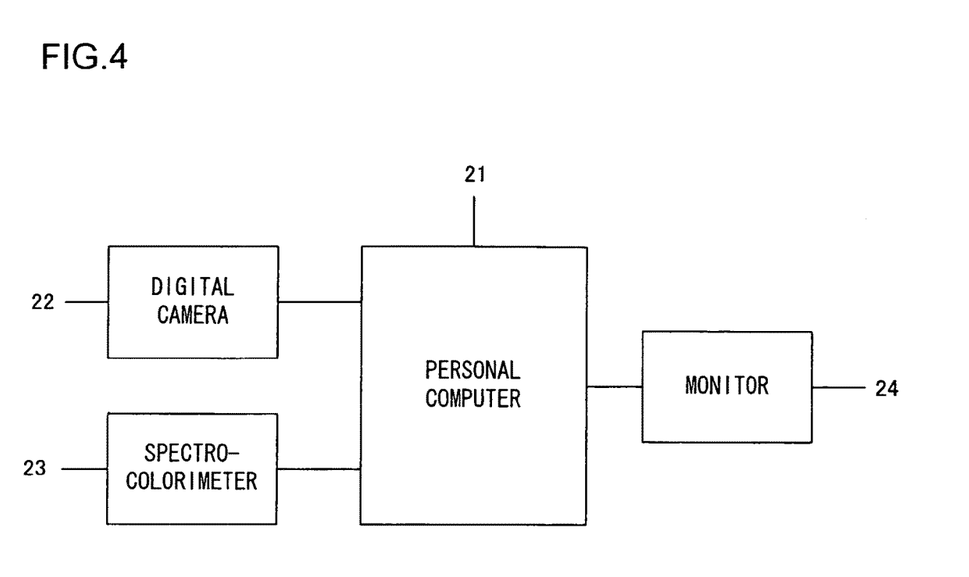
FIG. 4 A personal computer 21 utilized when determining the Matrix 1
Figure 7:
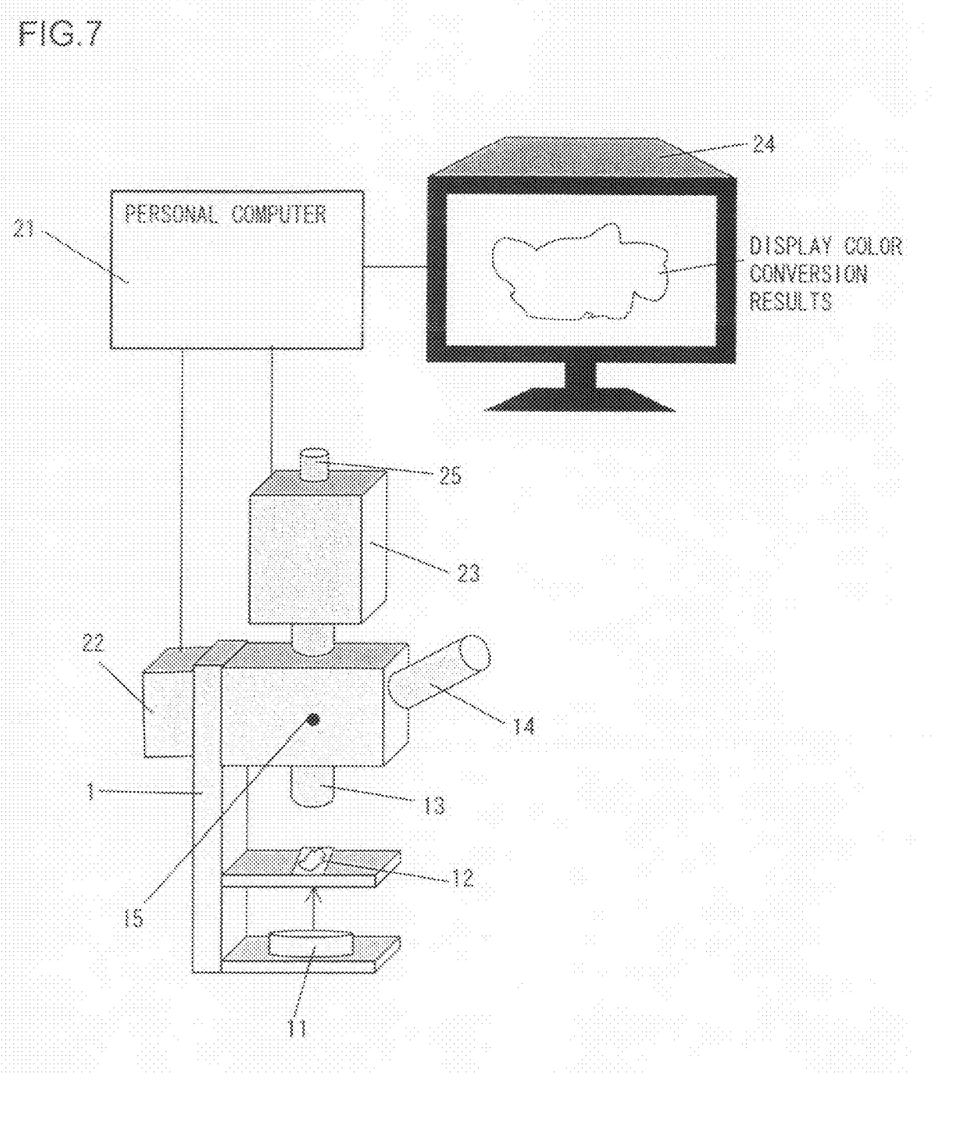
FIG. 7 The relationship among the personal computer 21, the digital camera 22, the spectro-colorimeter 23 and the microscope 1

FIG. 4 shows a personal computer 21 used when determining Matrix 1. A digital camera 22, a spectro-colorimeter 23 and the monitor 24 are connected to the personal computer 21. FIG. 7 illustrates the relationship among the personal computer 21, the digital camera 22, the spectro-colorimeter 23 and the microscope 1.

As shown in FIG. 7, the digital camera 22 is mounted on the microscope 1 and a microscope image is output to the personal computer 22. The image output from the digital camera 22 is constituted with raw data that have not undergone image processing and is the color space image ($R_0G_0B_0$) described earlier. The spectro-colorimeter 23, too, can be mounted on the microscope 1 in much the same way as the digital camera 22. The spectro-colorimeter 23 and the digital camera 22 are mounted at the microscope 1 by aligning their optical axes with the optical axes of the objective lens 13 and the eyepiece lens 14 of the microscope 1. Via the visual field selector switch 15, the microscope image is color-measured over the two-degree visual field range on the optical axis and the colorimetric value thus obtained is output to the personal computer 21. The colorimetric value is expressed in the CIE 1931 XYZ colorimetric system.

Since the optical axes of the spectro-colorimeter 23 and the digital camera 22 are aligned with the optical axes of the objective lens 13 and the eyepiece lens 14 of the microscope 1, a colorimetric value corresponding to an average pixel value within a pixel range over a radius r around the center of the photographic image can be measured via the spectro-colorimeter 23 by setting the color-measurement target area or the photographing target area of the specimen, observed through the eyepiece lens 14 of the microscope 1, at the image plane center, engaging the spectro-colorimeter 23 in measurement operation and photographing an image with the digital camera 22. It is to be noted that the radius r assumed over the photographic image is determined in correspondence to the magnification factor of the objective lens 13 and the measurement angle assumed at the spectro-colorimeter 23. Accordingly, r should be determined by comparing the specimen observed through a measurement range observation window 25 at the spectro-colorimeter 23 with the photographic image. The monitor 24 assumes characteristics such as the color temperature, equivalent to those of the monitor 3 in FIG. 1.

Figure 5:
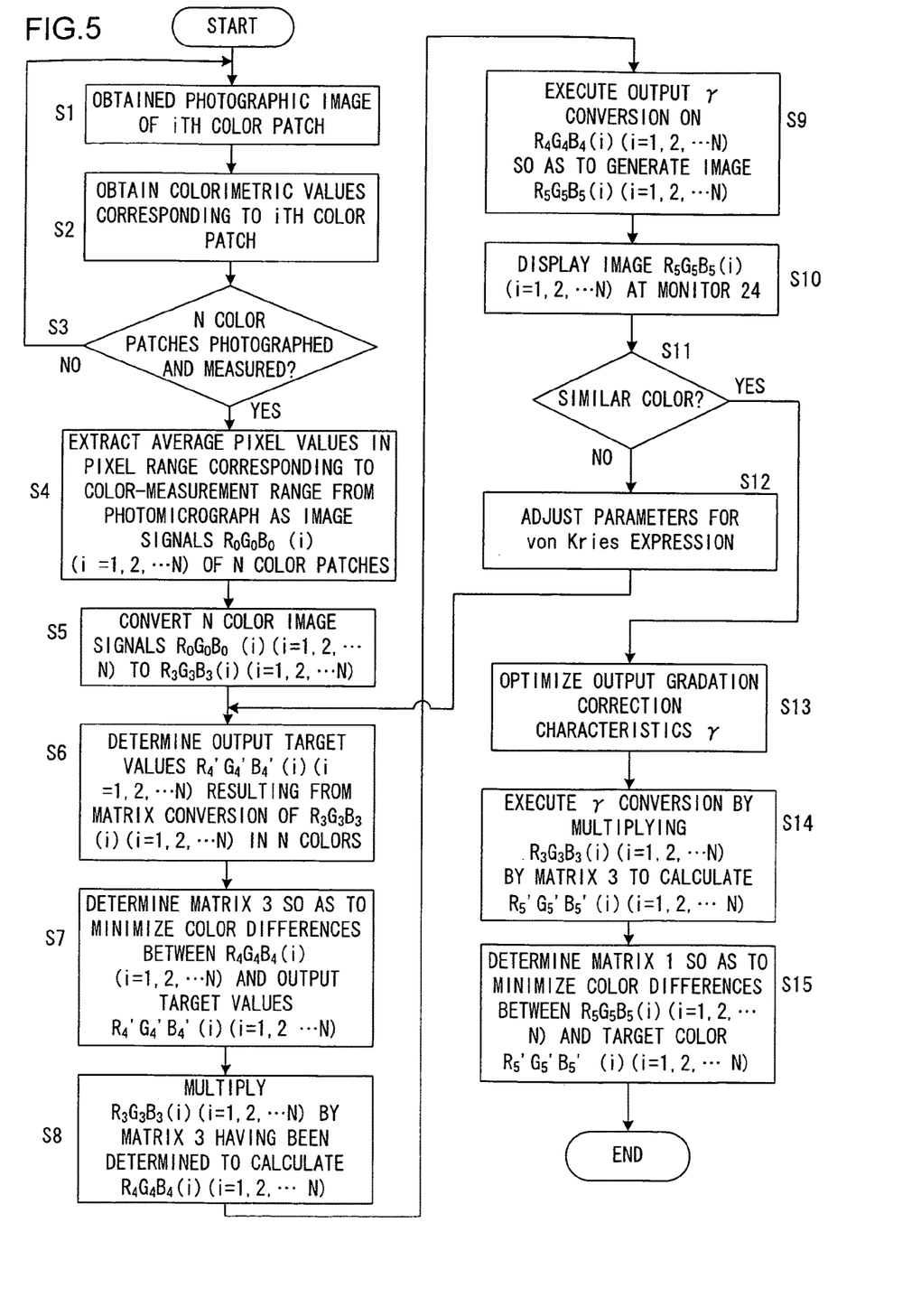
FIG. 5 A flowchart of the processing executed based upon an image processing program in the personal computer 21 in order to determine the Matrix 1
Figure 6:
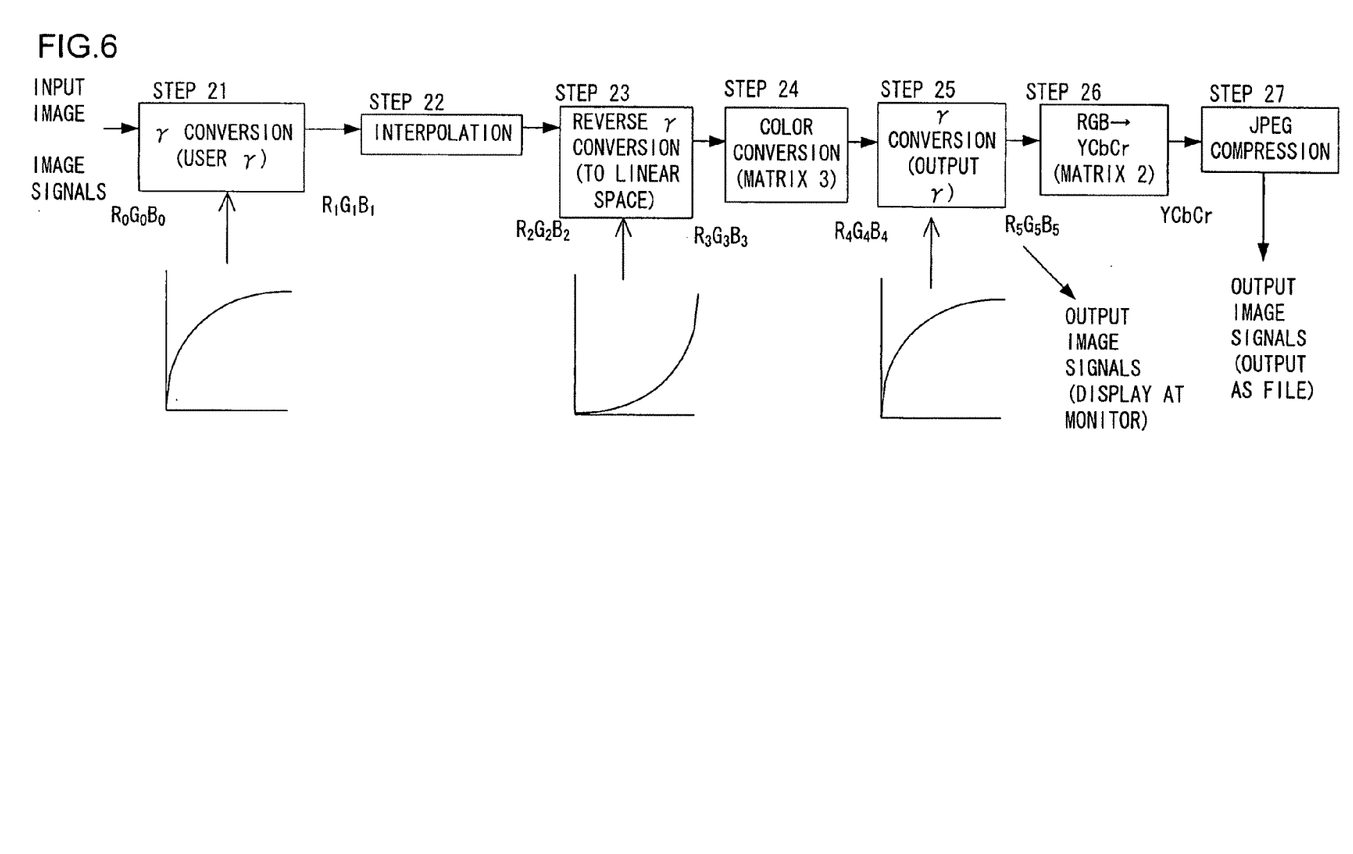
FIG. 6 A flowchart of the flow of processing executed to determine the Matrix 1

FIG. 5 presents a flowchart of the processing executed based upon an image processing program in the personal computer 21 in order to determine Matrix 1. FIG. 6 shows the flow of the processing executed to determine Matrix 1. The flow of the processing in FIG. 6 corresponds to that in FIG. 2 illustrating the flow of the image processing executed in the standard digital cameras, as described earlier.

The image processing program executed in the personal computer 21, which may be provided in a recording medium such as a CD-ROM or via the Internet or another electrical communication network, is installed in the personal computer 21. The personal computer 21 is constituted with a CPU (not shown) and its peripheral circuits (not shown) and the installed program is executed at the CPU.

Figure 8:
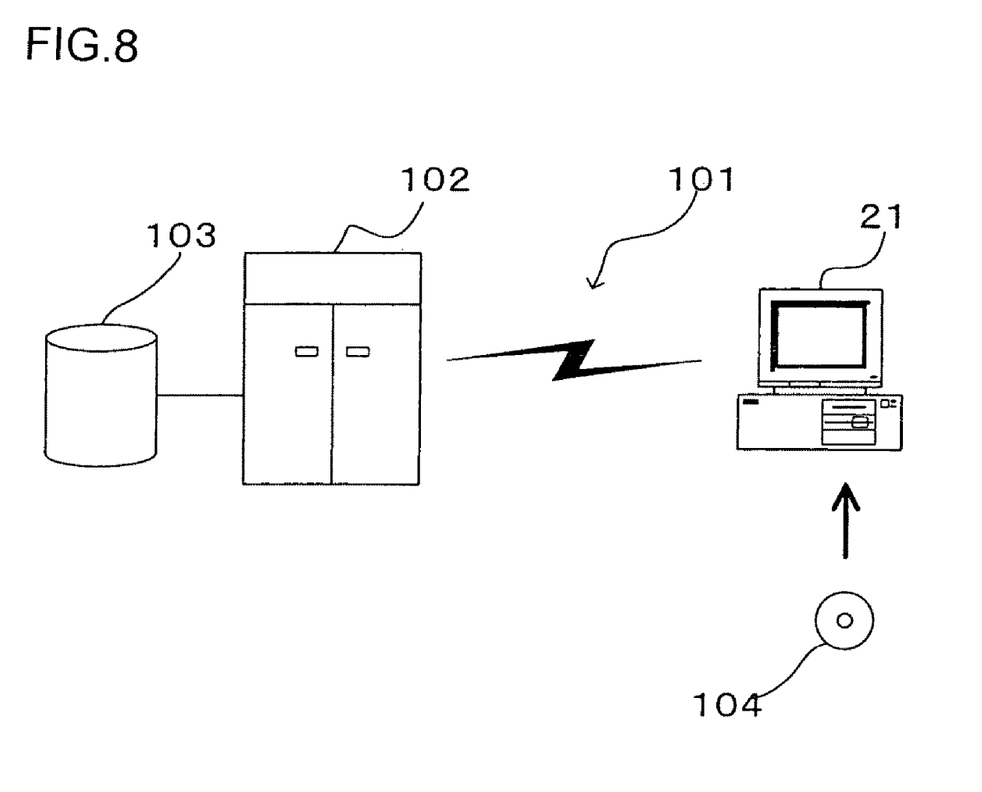
FIG. 8 An illustration showing how the image processing program may be provided to the personal computer 21

FIG. 8 illustrates how the image processing program may be provided to the personal computer 21. The personal computer 21 receives the program via a CD-ROM 104. In addition, the personal computer 21 has a function enabling it to connect with a communication line 101. A computer 102 is a server computer that provides the program stored in a recording medium such as a hard disk 103. The communication line 101 may be a communication network such as the Internet or a dedicated communication network. The computer 102 reads out the program from the hard disk 103 and transmits the program thus read out to the personal computer 21 via the communication line 101. Namely, the program embodied as a data segment is transmitted on a carrier wave via the communication line 101. The program can thus be distributed as a computer-readable computer program product assuming any of various modes including a recording medium, a data signal and a carrier wave on which a data signal is carried.

To resume the description in reference to FIG. 5, color patches in N colors are photographed and color-measured in steps S1~S3 in FIG. 5. In step S1, the observer sets the visual field selector switch 15 to the digital camera side, an ith color patch (i=1, 2, . . . N) is photographed with the digital camera 22 and the personal computer 21 takes in an image obtained by photographing the specimen through the microscope (hereafter may also be referred to as a microscope image) output from the digital camera 22. The observer shifts the stage (not shown) at the microscope 1 to set an area of the specimen 12 taking on a specific color (a colored area) on the optical axis and designates the area taking on the particular color as the ith color patch.

In step S2, the observer switches the visual field with the selector switch 15 to the spectro-colorimeter side in order to engage the spectro-colorimeter 23 in a color-measurement operation and the personal computer 21 takes in colorimetric values (XYZ) output from the spectro-colorimeter 23. Since the spectro-colorimeter 23, the digital camera 22 and the objective lens 13 and the eyepiece lens 14 at the microscope 1 are positioned so that their optical axes are aligned, the ith color patch under the microscope illumination, having been photographed with the digital camera 22 in step S1, can be color-measured with the spectro-colorimeter 23. In other words, uniform conditions, e.g., uniform illumination conditions and setting conditions, are selected for the specimen 12, the digital camera 22 and the optical systems present between the specimen 12 and the digital camera 22.

In step S3, a decision is made as to whether or not the N color patches have been photographed and color-measured. If the N color patches have not been photographed and measured, the operation returns to step S1 to repeat the processing, whereas if the entire photographing/measurement operation has been completed, the operation proceeds to step S4. Since the processing in steps S1 and S2 is executed continuously for each color patch, the positional misalignment between the center of the photographic image and the center of the color-measurement range can be minimized. Once a given color patch is photographed (S1) and measured (S2), the next color patch is photographed (S1) and measured (S2), until the N color patches are all photographed and measured.

In step S4, the average pixel values over the pixel range equivalent to the color-measurement range are extracted as image signals $R_0G_0B_0$ (i) (i=1, 2, ... N) of the N color patches from the images of the N color patches having been obtained through step S1. The N color patches are each extracted from an area of the corresponding image transmitted through a preparation equivalent to white color and from an area taking on a color characterizing the actual sample being observed. Namely, the N color patches take on colors appearing frequently in the image observed through the microscope. In other words, the N color patches represent colors that appear frequently in photographic images photographed in the target photographing system.

In STEP S5, the processing in STEPS 21~23 in FIG. 6 is executed so as to convert the image signals $R_0G_0B_0$ (i) (i=1, 2, N) corresponding to the N colors to $R_3G_3B_3$ (i) (i=1, 2, ... N). While the processing executed in STEPS 21~23 in FIG. 6 is similar to that executed in STEPS 1~3 in FIG. 2, the user gradation correction characteristics γ used in STEP 11 in FIG. 3, instead of the interpolation gradation correction characteristics γ in FIG. 2, are used as the gradation correction characteristics γ in STEPS 21 and 23.

In step S6, output target values $R_4'G_4'B_4'$ (i) (i=1, 2, ... N) for the N color image signals $R_3G_3B_3$ (i) (i=1, 2, ... N) are determined. The output target values $R_4G_4B_4$ (i) (i=1, 2, ... N) are determined based upon the colorimetric values XYZ (i) (i=1, 2, ... N) sampled over the N color patches in step S2 and viewing condition parameters. The method adopted when determining the output target values $R_4G_4B_4$ (i) (i=1, 2, ... N) is now described in detail.

As explained earlier, the color temperatures of the light source used when the image is directly observed with the naked eye and the light source used when observing the image on the monitor are different. The optimal color conversion that can be achieved under illumination conditions with different color temperatures can be ascertained based upon the von Kries expression (expression 1). Accordingly, the output target value $R_4G_4B_4$ (i) (i=1, 2, ... N) is determined based upon the von Kries expression (expression 1). Because the image observed with the naked eye through the eyepiece lens and the image observed on the monitor can be made to appear to have similar colors when the image reproduced on the monitor assumes tri-stimulus values ($X_{est}$, $Y_{est}$, $Z_{est}$) converted from the subject tri-stimulus values ($X_{ori}$, $Y_{ori}$, $Z_{ori}$) under the microscope illumination by factoring in the chromatic adaptation. In other words, color reproduction, which factors in the difference between the viewing condition in which the specimen is observed under the microscope illumination and the viewing condition in which the image provided on the monitor is viewed, is enabled.

[Expression 1]

$$\begin{bmatrix} X_{est} \\ Y_{est} \\ Z_{est} \end{bmatrix} = A^{-1} \cdot \begin{bmatrix} \frac{L_{est\_w}}{L_{ori\_w}} & 0 & 0 \\ 0 & \frac{M_{est\_w}}{M_{ori\_w}} & 0 \\ 0 & 0 & \frac{S_{est\_w}}{S_{ori\_w}} \end{bmatrix} \cdot A \cdot \begin{bmatrix} X_{ori} \\ Y_{ori} \\ Z_{ori} \end{bmatrix} \quad (1)$$

"A" represents a matrix used when converting the tri-stimulus values to a cone response LMS and CAT02 conversion matrix or the like, for instance, may be used as "A". In addition, $L_i, M_i, S_i$ (i=est_w, ori_w) indicate the white LMS response respectively adapted for microscope observation (i=ori_w) and adapted for monitor observation (i=est_w). Since the white adapted for monitor observation is affected by the ambient illumination (e.g., the illumination in the laboratory (room)) as well as the white at the monitor, the white adapted for monitor observation should be regarded as a combination of the white at the monitor and the white in the ambient illumination.

In addition, it is generally assumed that it takes approximately 2 minutes to achieve complete adaptation and if the user is looking back and forth at the specimen through the microscope and at the image on the monitor, the level of adaptation (adaptation coefficient) to the target white color point, as well as factors attributable to the white at the microscope and the white at the monitor, needs to be taken into consideration. An adaptive white color point at which the images observed through the microscope and on the monitor take on most similar appearance is determined by adjusting the adaptation coefficient and the mix ratio of the three types of illumination (the illumination at the microscope, the limitation at the monitor and the ambient illumination under which the monitor image is observed) and then the colorimetric values $XYZ_{ext}$ (i) (i=1, 2, ... N) to be used for monitor display are calculated based upon the colorimetric values $XYZ_{org}$ (i) (i=1, 2, ... N) obtained by color-measurement the N color patches, as expressed in (1) above.

If the image to be displayed at the monitor is constituted with sRGB data, the target image signals $R_4'G_4'B_4'$ (i) (i=1, 2, ... N) can be calculated based upon the calculated $XYZ_{ext}$ (i) (i=1, 2, ... N), since the relationship between the RGB signal values and the XYZ values is predefined. Once the target image signals $R_4'G_4'B_4'$ (i) (i=1, 2, ... N) are calculated as described above, the operation proceeds to step S7.

In step S7, Matrix 3 is optimized through the method of least squares or the like so as to minimize the color differences between the image signals $R_4G_4B_4$ (i) (i=1, 2, ... N) resulting from the conversion expressed in (2) below and the output target image signals $R_4'G_4'B_4'$ (i) (i=1, 2, N). The conversion expressed in (2) is equivalent to the processing executed in STEP 24 in FIG. 6. Namely, the data $R_3G_3B_3$ (i) (i=1, 2, ... N)

obtained through step S5 are multiplied by the values indicated by Matrix 3, thereby obtaining $R_4G_4B_4$ (i) (i=1, 2, ... N) and the color differences between the $R_4G_4B_4$ (i) (i=1, 2, ... N) and the $R_4'G_4'B_4'$ (i) (i=1, 2, ... N) are determined. This process is repeatedly executed by sequentially adjusting Matrix 3 until the optimal Matrix 3, with which the color differences are minimized, is determined. Matrix 3, which is the conversion matrix used to ultimately determine Matrix 1, may be regarded as a temporary matrix.

[Expression 2]

$$\begin{bmatrix} R_4(i) \\ G_4(i) \\ B_4(i) \end{bmatrix} = Matrix3 \cdot \begin{bmatrix} R_3(i) \\ G_3(i) \\ B_3(i) \end{bmatrix} \quad (2)$$

In step S8, the $R_3G_3B_3$ (i) (i=1, 2, ... N) are multiplied by Matrix 3 having been determined in step S7, so as to calculate $R_4G_4B_4$ (i) (i=1, 2, ... N). The processing executed in step S8 is equivalent to that executed in STEP 24 in FIG. 6. In step S9, the $R_4G_4B_4$ (i) (i=1, 2, ... N) having been calculated undergo output γ conversion so as to generate $R_5G_5B_5$ (i) (i=1, 2, ... N) image signals. The processing executed in step S9 is equivalent to that executed in STEP 25 in FIG. 6. In step S10, the image constituted with the $R_5G_5B_5$ (i) (i=1, 2, ... N) signals is brought up on display at the monitor 24.

In step S11, the observer makes a decision as to whether or not the color of the image displayed on the monitor and the color of the image actually observed through the microscope appear to be similar, and as the observer, having decided that the colors are similar, enters the decision results at the personal computer 21, the processing proceeds to step S13. If, on the other hand, the observer enters a negative decision at the personal computer 21, the processing proceeds to step S12. In step S12, to which the operation proceeds if the adaptation coefficient used to create Matrix 3 and the mix ratio of the three types of illumination (the illumination at the microscope, the illumination at the monitor and the ambient illumination under which the monitor image is observed) are not optimal, these parameters are readjusted and the operation returns to step S6 to repeatedly execute the processing.

In step S13, the output gradation correction characteristics γ are optimized. As explained earlier, due to the difference in the device brightness (between the brightness at the monitor and the brightness at the microscope) and the varying extents of the influence of the ambient brightness, the specimen observed on the monitor and the specimen observed through the microscope may be perceived to have different levels of contrast. Under such circumstances, the contrast must be adjusted by altering the output gradation correction characteristics γ so as to approximate the contrast of the image displayed on the monitor to the contrast of the image observed through the microscope or to achieve desirable contrast for the monitor display image.

The processing described above is repeatedly executed until the optimal Matrix 3, which renders the monitor display image in a color similar to the color of the specimen or which produces a monitor display image in a desirable color reproduction, is determined. Matrix 3 can be adjusted with a high level of accuracy by fine-adjusting the perceived color in a linear space, as in the processing executed in standard digital cameras.

Next, Matrix 1, equivalent to that obtained through the flow shown in FIG. 3, is created based upon the optimized Matrix 3 and the output gradation correction characteristics γ.

In step S14, the $R_3G_3B_3$ (i) (i=1, 2, ... N) having been obtained through step S5, are converted by using the optimized Matrix 3 (STEP 24 in FIG. 6) and nonlinear conversion is executed (STEP 25 in FIG. 6) by using the output gradation correction characteristics γ having been adjusted in step S13, so as to calculate the target image signals $R_5'G_5'B_5'$ (i) (i=1, 2, ... N).

In the processing executed in step S15, the image signals $R_2G_2B_2$ (i) (i=1, 2, N) obtained by executing interpolation on the N color patches having been output in STEP 22 during the processing executed in STEPS 21 through 23 as part of step S5, are used. Matrix 1 is optimized through the method of least squares or the like so as to minimize the color differences between the image signals $R_5G_5B_5$ (i) (i=1, 2, ... N) resulting from the conversion expressed in (3) below and the target image signals $R_5'G_5'B_5'$ (i) (i=1, 2, ... N) having been obtained through step S14. The conversion expressed in (3) below is equivalent to the processing executed in STEP 14 in FIG. 3. Namely, the data $R_2G_2B_2$(i) (i=1, 2, ... N) having been obtained during the processing executed in step S5 are multiplied by the values indicated by Matrix 1 to obtain the $R_5G_5B_5$ (i) (i=1, 2, ... N) and the color differences between the $R_5G_5B_5$ (i) (i=1, 2, ... N) and the target image signals $R_5'G_5'B_5'$ (i) (i=1, 2, ... N) are determined. This process is repeatedly executed by sequentially adjusting Matrix 1 until the optimal Matrix 1, which minimizes the color differences, is determined.

[Expression 3]

$$\begin{bmatrix} R_5(i) \\ G_5(i) \\ B_5(i) \end{bmatrix} = Matrix1 \cdot \begin{bmatrix} R_2(i) \\ G_2(i) \\ B_2(i) \end{bmatrix} \quad (3)$$

Matrix 1 thus determined is then installed into the image processing program in the digital camera 2, which executes the image processing shown in FIG. 3.

The following effects and advantages are achieved through the conversion matrix determining method described above and in a digital camera that executes color conversion by using the conversion matrix determined through the conversion matrix determining method.

(1) In the digital camera 2, image signals ($R_2G_2B_2$) in the nonlinear color space undergo matrix conversion executed by using the optimized linear conversion Matrix 1 in order to generate image signals ($R_5G_5B_5$) in the output image signal color space. Thus, high-speed processing is achieved while assuring desirable color reproducibility. In other words, an image taking on a color perceived to be similar to the color of the image observed through the microscope with the naked eye can be displayed in real-time on the monitor. More specifically, since the number of nonlinear conversion sessions that must be executed is reduced by two from that in the standard digital camera, faster processing is realized.

(2) While the use of Matrix 1 assures desirable color reproducibility for a specific color, no problem arises with regard to the perceived color of the image brought up on display at the monitor in microscope applications, as long as Matrix 1 is optimized in correspondence to the characteristics of the observation target specimen. Namely, since the color predominantly and frequently appearing in the observation target image is optimally reproduced, no problem arises in the microscope observation.

(3) Matrix 1 is determined by first optimizing, in a linear space, Matrix 3 to be used in the color conversion executed in the linear space. This means that since the fine-adjustment of the color appearance is executed in the linear space, as in a standard digital camera, Matrix 3 is adjusted with a high level of accuracy. Then, Matrix 1, i.e., the ultimate adjustment target, is adjusted by using the accurately adjusted Matrix 3 and, as a result, the optimal Matrix 1 can be determined with a high level of accuracy.

(4) Matrix 3 is determined by taking into consideration the chromatic adaptation affected by varying viewing conditions. As a result, the optimal Matrix 3 can be determined with a high level of accuracy. In particular, highly accurate Matrix 3 can be determined through a simple process as expressed in the chromatic adaptation expression of the known art by using colorimetric values obtained through measurement.

(5) The observer compares the image observed through the microscope with the naked eye with the monitor display image and makes a decision as to whether or not their appearances are similar. If the user decides that their appearances are not similar, the parameters are readjusted. In other words, Matrix 3 and Matrix 1 are determined in a state in which the appearance of the image observed through the microscope and the appearance of the monitor display image are perceived to be similar by the observer (person). As a result, Matrix 1, based upon which the images are rendered so as to be perceived as similar, can be determined with a high level of reliability.

(6) Since the contrast is adjusted by optimizing the output gradation correction characteristics γ so as to adjust the contrast of the monitor display image to approximate the contrast of the image observed through the microscope or to render the monitor display image with desirable contrast, the similarity between the appearances of the images can be maximized.

—Variations—

(1) By assuring the maximum similarity between the user gradation correction characteristics γ used in STEPS 21 and 23 in FIG. 6 and the output gradation characteristics γ used in STEP 25 in FIG. 6, the N colors used for the matrix creation can be reproduced with even better accuracy, even when the color conversion is achieved through matrix operation executed in the nonlinear color space. Such superior color reproduction is possible since, assuming that interpolation gradation correction characteristics γ=output gradation correction characteristics γ=2.0, for instance, the results ($R_5G_5B_5$) obtained by executing color conversion in a linear color space (the results obtained through the processing executed in STEPS 23~25 in FIG. 6) and the results ($R_5G_5B_5$) obtained by executing color conversion in a nonlinear color space (the results obtained through the processing executed in step 14 in FIG. 3) are identical, even when the conversion target data are ($2R_2 2G_2 2B_2$) assuming a brightness level twice that of ($R_2G_2B_2$).

(2) The data must be converted to the $R_5G_5B_5$ (i) (i=1, 2, . . . N) data, as shown in FIG. 3, for purposes of monitor display. However, if the data are to be output as a JPEG compressed file, the matrix operation will be executed twice in a row in STEPS 14 and 16 and, accordingly, Matrix 1×Matrix 2 may be calculated in advance in such a case.

(3) While an explanation is given above in reference to the embodiment on an example in which the present invention is adopted in conjunction with the microscope digital camera 2, the present invention may be adopted in conjunction with a device other than the microscope digital camera 2. In other words, it may be adopted in conjunction with all types of imaging apparatuses in to which Matrix 1, having been determined through the process described above, can be installed. The present invention will prove particularly effective when adopted in conjunction with an imaging apparatus that captures an image of a subject (a sample, a specimen or the like) having a limited range of color or a specific color.

(4) While the gradation correction characteristics γ used in step 11 in FIG. 3 and step 21 in FIG. 6 are user gradation correction characteristics γ, interpolation correction characteristics γ identical to those used in STEP 1 in FIG. 2 may be used instead.

(5) In the embodiment achieved to reproduce the color perceived through the microscope, color-measurement operation is executed in step S2 in FIG. 5 in order to determine the target color for the color reproduction. However, the target does not need to be determined based upon colorimetric values and the RGB values of an image photographed with a digital camera having known spectral sensitivity characteristics can be converted to corresponding colorimetric values XYZ based upon the spectral sensitivity and the characteristics of the light source at the microscope. Accordingly, a camera with a known conversion expression to be used to convert the camera RGB data to colorimetric values XYZ may be utilized in place of the spectro-colorimeter in the embodiment.

While the invention has been particularly shown and described with respect to a preferred embodiment and variations thereof by referring to the attached drawings, the present invention is not limited to these examples and it will be understood by those skilled in the art that various changes in form and detail may be made therein without departing from the scope and teaching of the invention.

The disclosure of the following priority application is herein incorporated by reference:

Japanese Patent Application No. 2006-202312 filed Jul. 25, 2006

The invention claimed is:

1. A conversion matrix generating method for generating a conversion matrix to be used in color conversion processing executed on a photographic image, comprising:

obtaining image data of an image of a subject having a certain color captured by an imaging apparatus under a given condition and a colorimetric value of a subject having the certain color measured by a colorimeter under the given condition; and generating a conversion matrix to be used to execute color conversion on an image signal in a nonlinear color space where a luminance value changes nonlinearly, based upon the image data and the colorimetric value having been obtained.

2. A conversion matrix generating method according to claim 1, wherein:

the given condition is a condition related to an optical system present between the subject and the imaging apparatus or between the subject and the colorimeter.

3. A conversion matrix generating method according to claim 1, wherein:

an image signal in a first color space, which is a nonlinear color space where the image data are expressed, is obtained;

the image signal in the first color space is converted through nonlinear conversion to an image signal in a second color space, which is a linear color space that changes linearly relative to the luminance value;

a temporary conversion matrix to be used in color conversion, through which the image signal in the second color space is converted to an image signal in a third color space, which is a linear color space, is generated;

color conversion is executed by using the temporary conversion matrix having been generated to convert the image signal in the second color space to the image signal in the third color space;

the image signal in the third color space is converted through nonlinear conversion to an image signal in a fourth color space, which is a nonlinear color space; and the conversion matrix is generated so as to minimize a color difference between an image signal obtained by executing color conversion on the image signal in the first color space based upon the conversion matrix and the image signal in the fourth color space.

4. A conversion matrix generating method according to claim 3, wherein:

the temporary conversion matrix is generated by taking into consideration a difference between a viewing condition in which the image data are obtained through a photographing operation and a viewing condition in which the image data are reproduced.

5. A conversion matrix generating method according to claim 4, wherein:

color of the subject is measured in the viewing condition in which the image data are obtained through a photographing operation;

a color to be taken on in the third color space is estimated based upon the colorimetric value obtained through color-measurement by taking into consideration chromatic adaptation attributable to the difference between the viewing conditions; and the temporary conversion matrix is generated based upon image data in the second color space and the estimated color in the third color space.

6. A conversion matrix generating method according to claim 3, wherein:

the nonlinear conversion from the first color space to the second color space is equivalent to nonlinear conversion from the fourth color space to the third color space.

7. A conversion matrix generating method according to claim 1, wherein:

the certain color is a color appearing frequently in the photographic image.

8. A conversion matrix generating method according to claim 7, wherein:

the conversion matrix that has been generated is used in an image processing program installed in a microscope digital camera; and the subject of the image data assumes a color appearing frequently in an image observed through a microscope.

9. A non-transitory computer readable medium having an image processing program stored thereon that enables a computer to execute a conversion matrix generating method according to claim 1.

10. An image processing device, comprising:

an image processing program enabling a computer to execute a conversion matrix generating method according to claim 1 installed on the device.

11. An imaging apparatus, comprising:

an image processing program that uses a conversion matrix generated through a conversion matrix generating method according to claim 1.

12. A conversion matrix determining method for determining a conversion matrix to be used in color conversion processing executed on a photographic image, comprising:

obtaining an image signal in a first color space that is a nonlinear color space;

converting through nonlinear conversion the image signal in the first color space to an image signal in a second color space, which is a linear color space that changes linearly relative to a luminance value;

determining a first conversion matrix to be used in color conversion executed to convert the image signal in the second color space to an image signal in a third color space, which is a linear color space;

executing color conversion by using the first conversion matrix having been determined to convert the image signal in the second color space to the image signal in the third color space;

converting through nonlinear conversion the image signal in the third color space to an image signal in a fourth color space, which is a nonlinear color space; and determining a conversion matrix so as to minimize a color difference between an image signal obtained by executing color conversion on the image signal in the first color space based upon the conversion matrix and the image signal in the fourth color space.

* * * * *